(12) United States Patent
Rodriguez Romero et al.

(10) Patent No.: US 11,597,384 B2
(45) Date of Patent: Mar. 7, 2023

(54) METHOD, APPARATUS, AND COMPUTER-READABLE STORAGE MEDIUM FOR PERFORMING A BRAKING OPERATION OF A VEHICLE

(71) Applicant: VALEO NORTH AMERICA, INC., Troy, MI (US)

(72) Inventors: Mirian Rodriguez Romero, Birmingham, MI (US); Ovidiu Buzdugan-Romcea, Birmingham, MI (US)

(73) Assignee: VALEO NORTH AMERICA, INC., Troy, MI (US)

( * ) Notice: Subject to any disclaimer, the term of this patent is extended or adjusted under 35 U.S.C. 154(b) by 298 days.

(21) Appl. No.: 17/020,000

(22) Filed: Sep. 14, 2020

(65) Prior Publication Data

US 2022/0080957 A1   Mar. 17, 2022

(51) Int. Cl.
*B60W 30/09* (2012.01)
*B60T 7/12* (2006.01)
*B60W 40/06* (2012.01)
*B60W 10/188* (2012.01)
*G06V 20/56* (2022.01)

(52) U.S. Cl.
CPC ............... *B60W 30/09* (2013.01); *B60T 7/12* (2013.01); *B60W 10/188* (2013.01); *B60W 40/06* (2013.01); *G06V 20/56* (2022.01); *B60W 2510/182* (2013.01); *B60W 2555/20* (2020.02)

(58) Field of Classification Search
CPC ..................................................... B60W 30/09
See application file for complete search history.

(56) References Cited

U.S. PATENT DOCUMENTS

| | | | |
|---|---|---|---|
| 8,180,544 B2 * | 5/2012 | Noffsinger | B60L 15/2045 303/167 |
| 9,990,332 B2 * | 6/2018 | Takahashi | B60T 7/18 |
| 11,312,366 B2 * | 4/2022 | Yang | B60W 30/18118 |
| 11,312,383 B2 * | 4/2022 | Kusukame | B60W 40/064 |

(Continued)

FOREIGN PATENT DOCUMENTS

| | | |
|---|---|---|
| CN | 103481850 B | 10/2015 |
| DE | 10 2011 116 112 A1 | 4/2013 |

(Continued)

*Primary Examiner* — Michael A Berns
(74) *Attorney, Agent, or Firm* — Oblon, McClelland, Maier & Neustadt, L.L.P.

(57) ABSTRACT

Method, apparatus, and computer-readable medium for performing a braking operation of a vehicle when an object is detected in front of the vehicle. The method includes acquiring at least one image of an external environment of the vehicle, determining a road condition of a road of the external environment of the vehicle based on the acquired at least one image, obtaining, based on the determined road condition and from memory, a braking table of one or more braking tables including distances and corresponding vehicle speeds at which the braking operation is performed, acquiring a speed of the vehicle and a distance between a preceding object and the vehicle, comparing the acquired speed of the vehicle and the acquired distance between the preceding object and the vehicle to the braking table, and sending, based on the comparison, an instruction to perform the braking operation of the vehicle.

20 Claims, 11 Drawing Sheets

(56) References Cited

U.S. PATENT DOCUMENTS

2021/0008999 A1* 1/2021 Rodriguez Romero ..................... B60L 53/12
2021/0026355 A1* 1/2021 Chen ...................... G06V 10/82
2021/0188261 A1* 6/2021 Song ...................... B60W 40/02

FOREIGN PATENT DOCUMENTS

JP          4136889 B2    8/2008
KR   10-2008-0052739 A    6/2008

* cited by examiner

| Speed [km/h] | Distance To Collision (mm) - Trigger E-Braking | | Distance To Collision (mm) - Trigger Pre-Fill | |
|---|---|---|---|---|
| | Dry | Snow | Dry | Snow |
| 0 | 150 | 420 | 200 | 630 |
| 2 | 412 | 1154 | 548 | 1730 |
| 4 | 684 | 1915 | 910 | 2873 |
| 6 | 1000 | 2800 | 1330 | 4200 |
| 8 | 1540 | 4312 | 2048 | 6468 |
| 10 | 2157 | 6040 | 2869 | 9059 |
| 12 | 2586 | 7241 | 3439 | 10861 |
| 14 | 3005 | 8414 | 3997 | 12621 |

FIG. 6

METHOD, APPARATUS, AND COMPUTER-READABLE STORAGE MEDIUM FOR PERFORMING A BRAKING OPERATION OF A VEHICLE

BACKGROUND

Field of the Disclosure

The present disclosure relates to performing a braking operation of a vehicle in response to detection of a preceding obstacle.

Description of the Related Art

Adverse weather has major impacts on the safety and operations of all roads, from signalized arterials to Interstate highways. Weather affects driver behavior, vehicle performance, pavement friction, and roadway infrastructure, thereby increasing the risk of crashes. For instance, rain, snow, and ice may dramatically affect the ability of a driver to safely operate a vehicle as driver vision, decision making, and vehicle handling are impaired.

To date, a robust approach to performing a braking operation of a vehicle during adverse weather conditions has yet to be developed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method, apparatus, and computer-readable storage medium comprising processing circuitry configured to perform a method of a braking operation of a vehicle.

According to an embodiment, the present disclosure further relates a method of a braking operation of a vehicle, comprising acquiring at least one image of an external environment of the vehicle, determining a road condition of a road of the external environment of the vehicle based on the acquired at least one image, obtaining, based on the determined road condition and from memory, a braking table of one or more braking tables including distances and corresponding vehicle speeds at which the braking operation is performed, acquiring a speed of the vehicle and a distance between a preceding object and the vehicle, comparing the acquired speed of the vehicle and the acquired distance between the preceding object and the vehicle to the braking table, and sending, by processing circuitry and based on the comparison, an instruction to perform the braking operation of the vehicle.

According to an embodiment, the present disclosure further relates to an apparatus for providing a braking operation of a vehicle, comprising processing circuitry configured to acquire at least one image of an external environment of the vehicle, determine a road condition of a road of the external environment of the vehicle based on the acquired at least one image, obtain, based on the determined road condition and from memory, a braking table of one or more braking tables including distances and corresponding vehicle speeds at which the braking operation is performed, acquire a speed of the vehicle and a distance between a preceding object and the vehicle, compare the acquired speed of the vehicle and the acquired distance between the preceding object and the vehicle to the braking table, and send, based on the comparison, an instruction to perform the braking operation of the vehicle.

According to an embodiment, the present disclosure further relates to a non-transitory computer-readable storage medium storing computer-readable instructions that, when executed by a computer, cause the computer to perform a method of a braking operation of a vehicle, the method comprising acquiring at least one image of an external environment of the vehicle, determining a road condition of a road of the external environment of the vehicle based on the acquired at least one image, obtaining, based on the determined road condition and from memory, a braking table of one or more braking tables including distances and corresponding vehicle speeds at which the braking operation is performed, acquiring a speed of the vehicle and a distance between a preceding object and the vehicle, comparing the acquired speed of the vehicle and the acquired distance between the preceding object and the vehicle to the braking table, and sending, by processing circuitry and based on the comparison, an instruction to perform the braking operation of the vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 6 is a graphical illustration of a braking table, according to an exemplary embodiment of the present disclosure;

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Performing a braking operation in adverse conditions, and in response to a roadway obstacle, can be difficult for human drivers and autonomous vehicles, alike. Braking systems, including emergency braking systems, use information provided by a variety of vehicle sensors, including ultrasonic sensors, cameras, radar, and laser scanners, in order to observe the environment, create a map of the environment, and detect obstacles such as vehicles or other objects that are present within a driving tube of a host vehicle. Based on information from one or more of the variety of vehicle sensors indicating a position of an obstacle, a distance to collision can be calculated. This calculated distance can then be evaluated in view of a speed of the vehicle to determine if a braking operation is required in order to avoid imminent collision.

The widespread adoption of vehicles having at least a requisite level of autonomy offers the possibility of improved navigation during adverse weather conditions. Relatively limited attention, however, has been directed to enhancing performance of semi- or fully-autonomous vehicles under such conditions. Notably absent is a consideration of roadway conditions which can greatly impact the ability of the vehicle to perform the braking operation and to stop the vehicle prior to collision. For example, adverse weather conditions, including winter weather conditions like rain, snow, and ice, may dramatically affect a distance required by a vehicle in order to safely perform a braking operation and stop the vehicle. When driving on ice, the distance required to safely perform a braking operation can be increased by as much as 10 times that of a braking operation performed during dry weather conditions.

Figure 1:
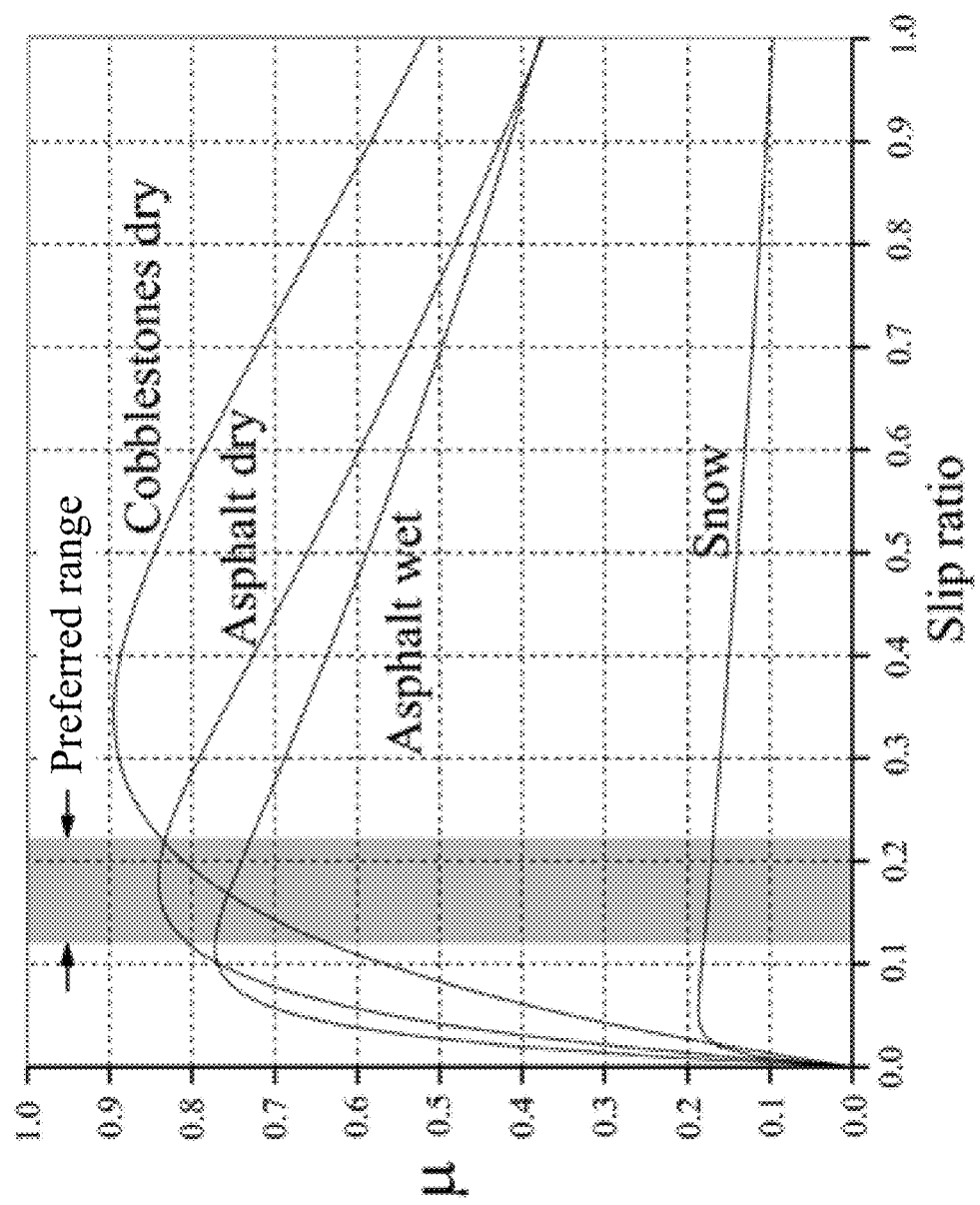
FIG. 1 is a graphical illustration of road friction under varying weather conditions.

This is largely due to the fact that tire traction may be severely reduced in such conditions, as evidenced by the graphic of FIG. 1. In FIG. 1, where slip ratio is on the x-axis and friction coefficient is on the y-axis, it can be appreciated that varying road types and varying road conditions have a significant impact on traction between a vehicle and a road surface when the vehicle is traveling at a constant speed.

It can be intuited that a maximal friction coefficient is advantageous for performing a braking operation. However, for different road conditions, the maximal friction coefficient varies widely and may occur at different slip ratios, as shown in FIG. 1. As a result, increased stopping distances during braking are required in order to account for reduced friction coefficients and increased slip ratios.

In an effort to develop a generalized approach to braking operations, previous work has established a 'preferred range', an example of which is indicated by the shaded area of FIG. 1. Such a 'preferred range' establishes a range of friction coefficient-slip ratio values, informed by empirical data on varied road surface conditions, which can be generally implemented within present day vehicle braking operations independent of actual road types and road conditions. As can be observed in FIG. 1, however, this approach fails to exploit the maximal friction coefficient of each vehicle and, potentially, results in braking operations that are not appropriate for the variety of road surface conditions that may be experienced in real life.

Thus, it can be deduced from the above that any braking operation performed during adverse weather conditions will need to consider a dynamic set of parameters, including a type and a quality of a road surface, in order to safely stop. Instead of applying a generalized approach based only on vehicle traits (e.g., weight, tire size, tire width), a braking operation will need to consider the road type and the road condition, along with other parameters related to the specific vehicle and roadway involved, in order to safely preform a braking operation. For instance, the keys to safely handling a vehicle on slippery winter roads include slower speeds, gentler stops and turns, and increased following distances. Such considerations must be accounted for when performing a braking operation in a semi- or fully-autonomous vehicle.

In view of the above, it can be appreciated that any braking operation needs to consider roadway conditions in order to determine how and when to apply a braking operation.

Accordingly, the present disclosure describes a method, apparatus, and computer-readable storage medium for performing a braking operation of a vehicle during adverse weather conditions.

According to an embodiment, the present disclosure takes into account road conditions, including road surface type and road surface quality, in calculating a distance to collision with an obstacle within a driving tube of a vehicle.

In an embodiment, the road surface type and the road surface quality can be detected via one or more of a plurality of vehicle sensors, including cameras. In certain instances, only one camera may be sufficient. In other instances, using more than one camera may increase confidence in a road type classification and/or road quality classification. Moreover, more than one camera may aid in a distance determination.

In an embodiment, the one or more of a plurality of vehicle sensors may be a camera(s) used to acquire images of an external environment of the vehicle such that the road surface type and road surface quality can be determined. This determination can include classification of the road surface type as asphalt, gravel, cobblestone, dirt, rocks, and the like, and classification of the road surface quality as icy, wet, dry, snowy, and the like, as appropriate.

According to an embodiment, the acquired images can be processed according to an algorithm based on an artificial neural network or other computer vision algorithm for image segmentation and image classification. The processed images can be used to provide a braking system of a vehicle with information regarding road surface type and/or road surface quality. In an example, the artificial neural network may be a convolutional neural network. The convolutional neural network may be trained with labeled road images to be able to automatically learn the features that are most beneficial to road condition classification.

In an embodiment, the acquired images may be first processed to detect a road and, second, to classify the detected road. In an example, semantic segmentation may be applied to the acquired image to detect and localize the road within the acquired image.

According to an embodiment, braking operations of a vehicle may be based on one or more parameters, including a distance to collision which may be calculated on the basis of one or more of a plurality of vehicle sensors, and/or a time to collision which may be calculated on the basis of the distance to collision and a relative speed of the vehicle. For instance, if the time to collision or the distance to collision satisfies a certain threshold, a braking operation may be initiated.

According to an embodiment of the present disclosure, different thresholds can be defined by different braking tables that correspond to a road surface type, road surface quality, and certain vehicle traits. In this way, different braking tables can be generated according to the road type and the road surface detected using a computer vision algorithm. Such braking tables may include, among others (a) a braking table for ideal conditions (e.g., dry asphalt and concrete), (b) a braking table for ice (e.g., icy asphalt and concrete), (c) a braking table for heavy rain (e.g., wet asphalt and concrete), and (d) a braking table for snow (e.g., snowy asphalt and concrete).

Moreover, the different braking tables can be calculated based on experimental tests performed on each of a variety of scenarios or based on a braking algorithm that uses slip ratio, as in FIG. 1, and friction coefficient, together with a braking table for ideal conditions, in order to determine the different braking tables. For example, the (b) braking table for ice could use values from (a) adapted based on the inputs received from the algorithm. In other words, consider a host vehicle driving on an icy asphalt road at 10 km/h towards a static obstacle. Under ideal conditions, the host vehicle may initiate a braking operation at a distance of 2.1 m from the obstacle. However, on the icy asphalt road, additional stopping distance is needed. Accordingly, an output of a braking algorithm may be 4 and a braking operation may be triggered when the host vehicle is 8.4 m away from the static obstacle (instead of 2.1 m away from the obstacle).

Further to the above, and as it is not good practice to perform a full braking operation (i.e. emergency braking operation) when driving on ice, snow, or water, certain embodiments of the present disclosure describe performance of a pre-fill braking operation in advance of a full braking operation. Pre-fill braking is a braking function that prepares the brakes for a hard braking operation by automatically increasing pressure in the brake system before an emergency braking operation is applied. By 'prefilling' the brake hydraulics with fluid, braking system reaction time can be shortened, thereby leading to a shorter braking distance and safer braking operation. To this end, the pre-fill braking operation also brings the brake pads closer to the braking discs, thereby speeding up the braking effect for optimal stopping. In such embodiments, a corresponding braking table includes data related to a pre-fill braking operation, and the pre-fill braking operation can be initiated when certain pre-fill braking operation conditions are met. During a pre-fill braking operation, the accelerator pedal may be deactivated.

In an embodiment, and in the absence of sensors configured to locally determine these parameters, the methods described herein may further include use of geolocation-based weather data from the Internet to estimate road surface type and road surface quality. Methods described herein may also use a road surface database including annotated roadway maps to understand, upon querying the road surface database based on geolocation data, for instance, a type of road surface the vehicle is traveling on (e.g., asphalt, cement). Each of the annotated roadway maps may be a high definition (HD) map.

Figure 2:
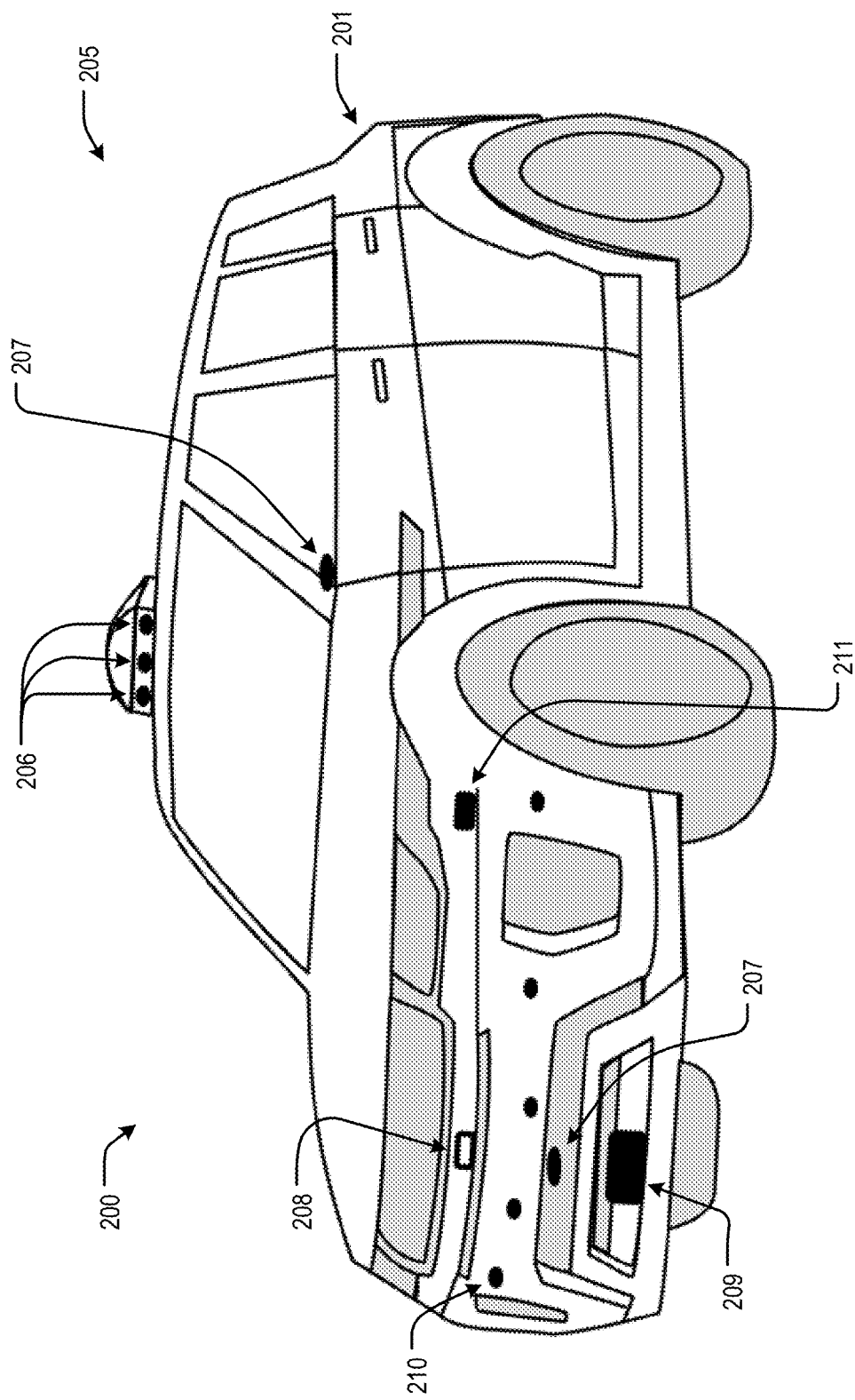
FIG. 2 is an illustration of a vehicle, according to an exemplary embodiment of the present disclosure.
Figure 9:
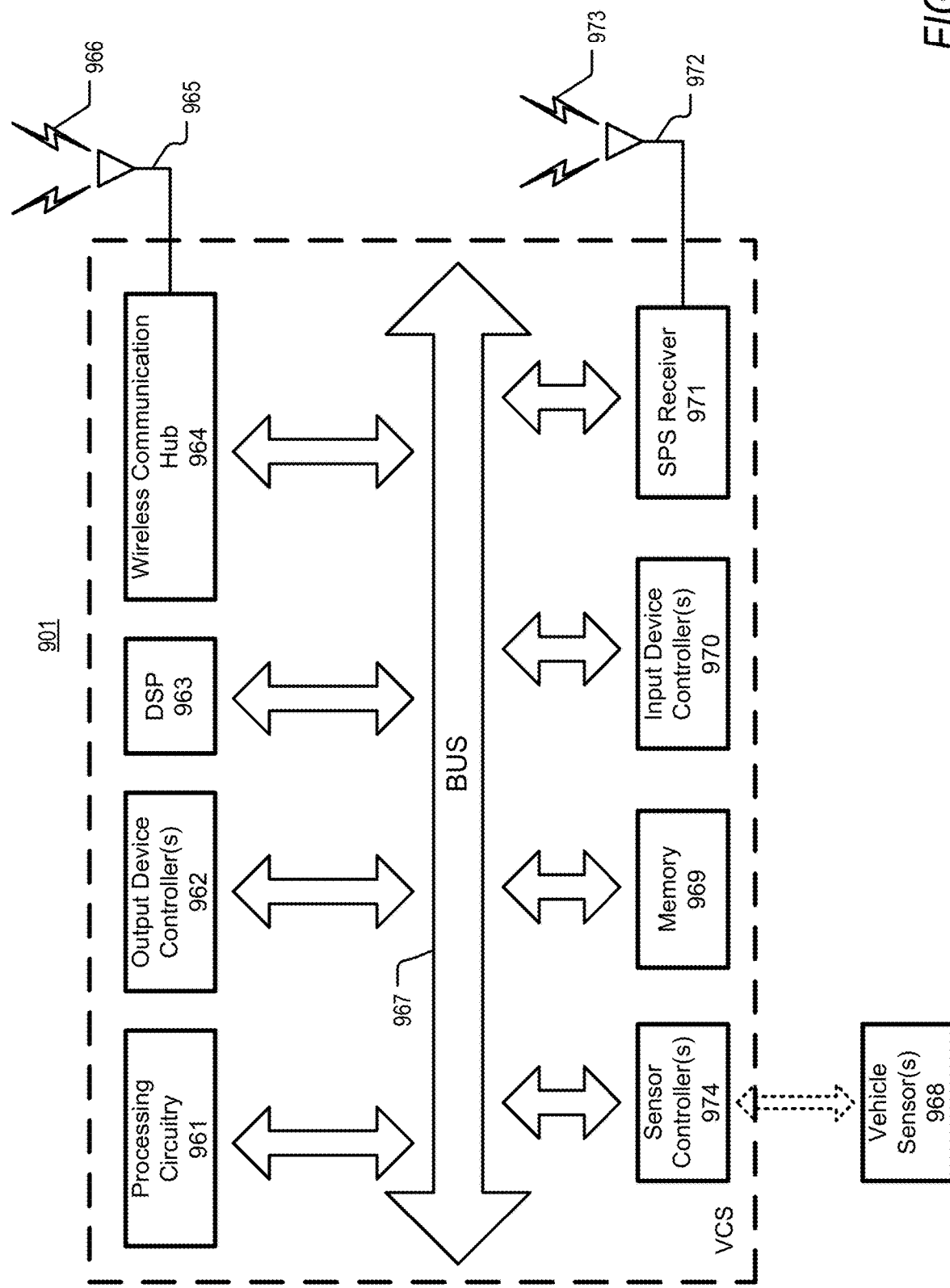
FIG. 9 is a block diagram of a vehicle control system, according to an exemplary embodiment of the present disclosure.

It can be appreciated that the methods introduced above can be implemented within a vehicle implementing an active safety system, within a semi-autonomous vehicle (SAV), and/or within a fully-autonomous vehicle. With reference again to the Figures, FIG. 2 is an illustration of an SAV, according to an exemplary embodiment of the present disclosure. In order to operate accurately and with precision, the SAV 200 can be outfitted with a plurality of vehicle sensors 205, including, among others, one or more cameras 206, one or more surround view cameras 207, at least one radar (radio detection and ranging; herein "radar") 208, at least one LiDAR (light detection and ranging; herein "lidar") 209, at least one ultrasonic sensor 210, and one or more corner radar 211. Data acquired from the plurality of vehicle sensors 205 can be sent to a vehicle control system 201, comprising, among other components, processing circuitry(s), a storage medium, image processing circuitry(s), and communication circuitry(s), in order to be processed, locally and/or globally, and utilized in vehicle operation. In one embodiment, the vehicle control system 201 can be an electronic control unit, "electronic control unit" being used herein to describe any embedded system in automotive electronics that controls one or more electrical systems or subsystems in a vehicle, including, among others, a telematics control unit, an engine control module, and a powertrain control module. One implementation of the vehicle control system 201 is illustrated in FIG. 9. The above-described plurality of vehicle sensors 205 of the SAV 200 will be discussed in brief below.

Regarding the one or more cameras 206, the cameras may be positioned along a forward panel of the SAV 200 and arranged such that, in the case of a plurality of cameras, a parallax is created between the viewpoints. The parallax can be subsequently exploited, based upon the fixed geometric relationship between the viewpoints along the panel of the SAV 200, to determine a distance to an obstacle, or impediment. To this end, the one or more cameras 206 may provide mono- or stereo-scopic perspective. The one or more cameras 206 can employ, among other sensors, CMOS image sensors.

Regarding the one or more surround view cameras 207, the surround view cameras may be positioned around the SAV 200 in order to create a parallax and to obtain a 360° representation of the vehicle surroundings. As before, the parallax can be subsequently exploited, based upon the fixed geometric relationship between the viewpoints, in order to determine a distance to an obstacle, or impediment. The one or more surround view cameras 207 can employ, among other sensors, CMOS image sensors.

Regarding the above-described one or more cameras 206 and one or more surround view cameras 207, in addition to distancing, the output of the cameras 206, 207 can be further processed by the vehicle control system 201 to identify the vehicle surroundings. For instance, the image processing circuitry(s) of the vehicle control system 201 can perform one or more image classification operations on an output of the cameras 206, 207 in order to determine a road condition (e.g., a road surface type and a road surface condition).

Regarding the at least one radar 208, the radar may be positioned along a forward panel of the SAV 200. The at least one radar 208 can be one selected from a group of radars including, among others, short range radar, medium range radar, and long range radar. In an embodiment, and as employed commonly in Adaptive Cruise Control and Automatic Emergency Braking Systems, the at least one radar 208 may be a long range radar with an operational range of, for example, a few hundred meters. The at least one radar 208 may be used to measure a distance between the SAV 200 and a preceding obstacle, or impediment.

Regarding the at least one lidar 209, the lidar may be positioned, for example, at a forward facing position and/or at a position with a 360° viewpoint. The at least one lidar 209 can be an infrared lidar system using a rotating laser via a micro-electro-mechanical system, a solid-state lidar, or any other type of lidar. In one embodiment, the at least one lidar 209 can provide a 905 nm wavelength with up to a 300 meter operational range.

In an embodiment, radar and lidar may be interchangeable, mutatis mutandis, for certain distancing applications.

Regarding the at least one ultrasonic sensor 210, the ultrasonic sensor may be disposed at corners of the SAV 200 for, in particular, short-range distancing. The at least one ultrasonic sensor 210 can be an ultrasonic sensor having asymmetric directivity (110°×50°), short ringing time and high sound pressure, sensitivity and reliability, and be configured to produce, among others, a 40 kHz, 48 kHz, 58 kHz, or 68 kHz nominal frequency as required by the current situation.

Regarding the one or more corner radars 211, the radars can be substantially similar to the above-described at least one radar 208. Deployed as corner radars, the one or more corner radars 211 can be short range radar or medium range radar, as demanded, and can be broadband Frequency Modulated Continuous Wave radar.

In an embodiment, a combination of longitudinally-acquired (time-based) data from the above-described camera and distancing systems (radar and/or lidar, front cameras, ultrasonic) can be used to extract speed and outlines of obstacles and moving objects.

In an embodiment, the sensors exploited in performing distancing can be based on a traveling speed of the SAV. For instance, surround-view cameras and ultrasonic sensors may be used when the SAV is traveling at speeds below ~15 km/h, while camera, radar, and lidar may be used when the SAV is traveling at speeds above 50 km/h. A combination of sensors may be used when the SAV is traveling at speeds therebetween.

Of course, it can be appreciated by one of ordinary skill in the art that the above-described plurality of sensors 205 do not constitute an exhaustive list and are merely exemplary of vehicle sensors that may be found on an SAV or other vehicle. In that context, any combination of vehicle sensors, described herein or not, can be integrated in order to achieve the function of the methods described herein.

Figure 3:
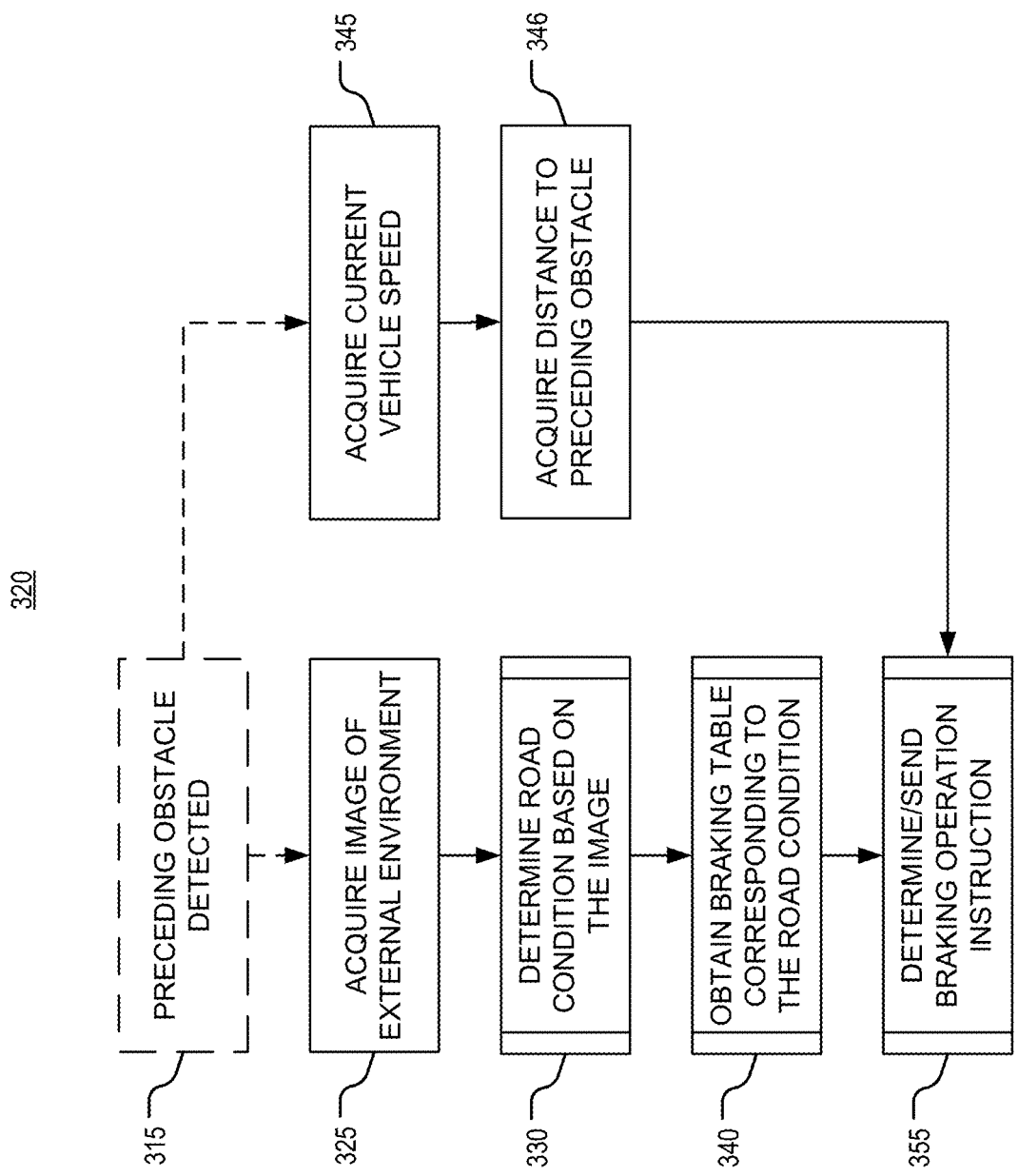
FIG. 3 is a flow diagram of a method of performing a braking operation of a vehicle, according to an exemplary embodiment of the present disclosure.

According to an embodiment, and with reference to FIG. 3, the above-described vehicle sensors, in communication with the vehicle control system 201 of FIG. 2, allow for implementation of a braking operation based on, among other relevant factors, a road surface type, road surface quality, and a distance to a preceding obstacle. For example, the one or more cameras 206 can be used to obtain images of an environment surrounding the SAV 200. The obtained images can be processed by applying a neural network trained to detect and classify a road condition of a road of the obtained image, the classification informing a selection of a corresponding braking table. Further, the at least one radar 208 and/or the at least one lidar 209 can be used to determine a distance to a preceding object, or obstacle, that can be used in conjunction with the corresponding braking table to determine if and when a braking operation needs to be performed.

Method 320 of FIG. 3, which may be controlled by the vehicle control system of the SAV, sets forth a process for determining if a braking operation needs to be performed based on a road condition-specific braking table, a traveling speed of an SAV, and a distance between the SAV and a preceding obstacle. It should be appreciated that an SAV is merely exemplary of a vehicle having at least some level of autonomy that would allow for the necessary processes described herein to be performed and is not meant to be exclusive. Moreover, it should be appreciated that the preceding obstacle may be any impediment to vehicle travel, such as a vehicle, a tree, an animal, and the like.

According to an embodiment, method 320 may be initiated by detection of a preceding obstacle at step 315 of method 320. In one instance, detection can be defined as a function of a calculated distance between the SAV and the forward positioned object, or preceding obstacle. When the calculated distance between the SAV and the forward positioned object is below a predetermined distance, the forward positioned object is determined to be a detected preceding obstacle. In another instance, detection can be defined as a function of a confidence level of a classification of an acquired image of the surrounding environment. In either instance described above, or following detection by another means, method 320 may continue following detection at step 315 at method 320.

It can be appreciated, however, that detection of a preceding obstacle, in an embodiment, is not necessary for performance of method 320, as the presence of any specific type of object is irrelevant to the processes of method 320. Accordingly, the remainder of method 320 will be described without requirement for preceding obstacle detection.

At step 325 of method 320, an image of an external environment of the SAV may be acquired via one or more cameras of the SAV. The acquired image may include a driving tube of the SAV, for instance. In an example, the one or more cameras of the SAV may be one camera. At sub process 330 of method 320, a road condition may be determined on the basis of the acquired image of the external environment of the SAV. Described in detail with reference to FIG. 4, the determination may include, in an example, detection of the road from the acquired image and determination of a road condition thereof. The determined road condition can include a determined road surface type and a road surface quality that can be used at sub process 340 of method 320 to obtain a corresponding braking table. The corresponding braking table may be one of a plurality of reference braking tables that provide guidelines by which a braking operation (e.g., emergency braking operation, pre-fill braking operation) may be initiated. Sub process 340 of method 320 will be described in greater detail with reference to FIG. 5.

Concurrently to the above, host vehicle metrics may be obtained. For instance, a current speed of the SAV may be acquired from the vehicle control system at step 345 of method 320 and a distance between the SAV and a preceding obstacle may be acquired at step 346 of method 320. It can be appreciated that each of the SAV speed and the distance to the preceding obstacle may be continuously and iteratively determined in order to provide real-time information for processing at sub process 355 of method 320. In an example, step 346 of method 320 may deploy the at least one radar and/or the at least one lidar of the SAV, among other tools, for the determination of the distance to the preceding obstacle. To this end, a time-dependence of a signal from the at least one radar, for example, may be used to calculate the distance to the preceding obstacle.

Outputs from the above-described steps of method 320 can be received for processing at sub process 355 of method 320. Sub process 355, which will be described in greater detail with respect to FIG. 7A through FIG. 7C, describes a determination of whether the acquired SAV speed and the acquired distance to the preceding obstacle satisfy conditions to begin a braking operation. Such a determination can be made in view of the corresponding braking table obtained at sub process 340 of method 320. In an example, the braking operation may be a full braking operation, or emergency braking operation. In an example, the braking operation may include a pre-fill braking operation and an emergency braking operation. Such braking operations will be described in greater detail with reference to subsequent Figures, but it can be appreciated that either braking operation may be initiated based on a determination that the SAV speed and the distance to the preceding obstacle satisfy conditions of the road surface condition-based braking table.

In view of the above, it can be appreciated that once it is determined that a braking operation is required the vehicle control system may modulate the speed and braking operation of the SAV in order to satisfy the corresponding braking table. Such modulation may include sending a control signal to the powertrain control module in order to modulate the speed and braking systems of the vehicle.

Of course, while method 320 is described above as implemented in a single instance, the steps of method 320 may be performed iteratively in order to update controlling signals that modulate performance of the SAV. For instance, the SAV speed and the distance to the preceding obstacle can be iteratively determined in real-time so that, in the event the distance to the preceding obstacle abruptly changes and is greater than that required for safe braking, the speed and braking operation of the SAV may be adjusted, appropriately. Moreover, the condition of the road can be iteratively determined so that a drying road surface can be properly reflected in selection and acquisition of a corresponding braking table.

Figure 4:
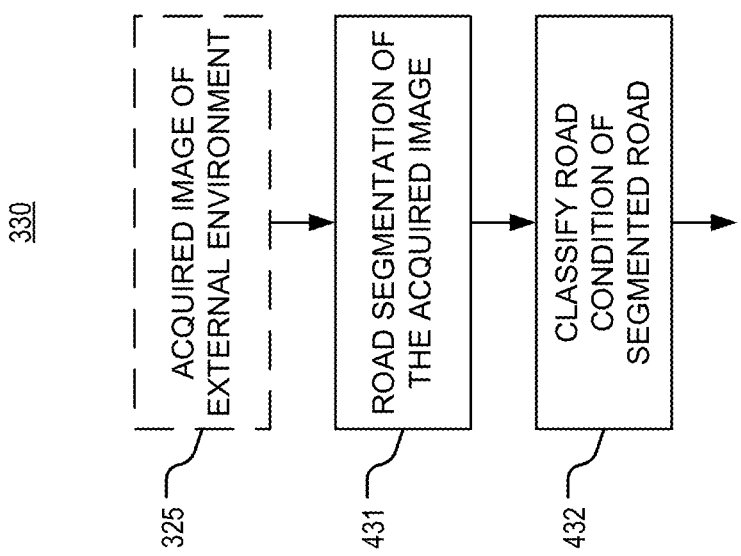
FIG. 4 is a flow diagram of a sub process of a method of performing a braking operation of a vehicle, according to an exemplary embodiment of the present disclosure.

With reference now to FIG. 4, sub process 330 of method 320 will be described. At step 431 of sub process 330, an image acquired of the external environment of the SAV at step 325 of method 320 can be processed in order to identify and isolate a road of the acquired image.

To this end, a number of image processing techniques can be applied, including image segmentation. In an example, semantic image segmentation is used, allowing for detection and localization of a road within the acquired image. The semantic image segmentation may be performed by applying a convolutional neural network to the acquired image, the convolutional neural network having been trained to label specific regions of the acquired image according to known categories via pixel-based classification. In other words, semantic image segmentation permits labeling of each pixel of the acquired image with a corresponding class of what is being represented (e.g., road, car, tree, pedestrian, animal, etc.).

In an embodiment, the convolutional neural network described above can be obtained by transfer learning. In other words, the convolutional neural network may be an existing, well-studied image classification network that serves as an encoder module for the network, appending a decoder module with transpose convolutional layers to upsample coarse feature maps into a full-resolution segmentation map. Accordingly, the present disclosure may include a fully convolutional-adaptation of AlexNet, the VGG net, and GoogLeNet.

At step 432 of sub process 330, the segmented road of the acquired image may be further processed to determine a road condition thereof. The road condition may be a road surface quality including wet, dry, and the like, and/or a road surface type including gravel, asphalt, concrete, dirt, and the like. The road surface quality may further include classifications regarding a type of wetness, such as wetness resulting from snow, ice, rain, or other type of moisture.

The further image processing of the segmented road may be by application of an image classification technique. The image classification approach may be based on application of a convolutional neural network to the segmented road of the acquired image, the convolutional neural network having been trained to label the entire image, or segmented road of the acquired image, as one of a number of classes. In other words, image classification is the process of taking an input and outputting a class or a probability that the input is a particular class. Considered in view of the present disclosure, the class that may be predicted may be a road surface quality and road surface type such as, among others, 'wet, snow, asphalt', 'wet, ice, concrete', and 'dry, asphalt'. In this way, the segmented road may be further processed to generate a classification or a probability that the segmented road is one of a number of classes.

While sub process 330 of method 320 is described above as including a two-step process, wherein a road is first segmented from the acquired image and then further classified into a road condition class, sub process 330 of method 320 may be alternatively performed within a single classification process. For instance, the semantic image segmentation technique described above may be configured to, instead of labeling a region of the acquired image as road, label a region of the acquired image as 'dry, concrete' road. It can be, of course, appreciated that such approach may require more intensive training and may require, during run time, increased processing power.

In either instance, a resulting classification of sub process 330 of method 320 may be output to sub process 340 of method 320 and used for obtaining an appropriate braking table.

In addition to the above, the determination of the road condition may be based on current weather conditions, information from neighboring vehicles obtained via vehicle-to-vehicle communication, and/or stored information related to the currently traveled road. For instance, the SAV may be configured to receive a weather forecast from a meteorological service based on a current geolocation of the SAV, and the weather forecast may be used in order to determine the road surface quality. In another instance, the SAV may be configured to access a HD map of the currently traveled road, annotations of the HD map indicating a road surface type that the SAV is currently traveling on. The HD map may then be used to determine a current road surface type that can be used in conjunction with the weather based-road surface quality to determine a proper braking table.

Figure 5:
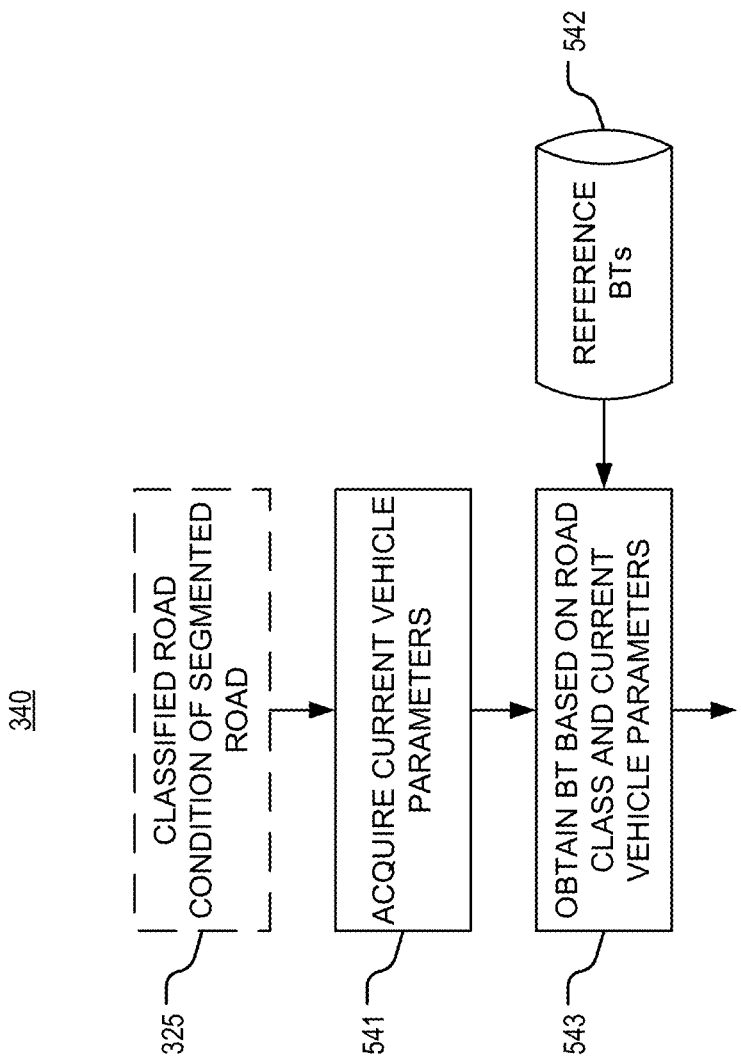
FIG. 5 is a flow diagram of a sub process of a method of performing a braking operation of a vehicle, according to an exemplary embodiment of the present disclosure.

Turning now to FIG. 5, the determined road condition of sub process 330 of method 320 can be used in order to obtain a corresponding braking table. The corresponding braking table may include a current vehicle speed and at least one set of minimum distances indicating when either or both of a pre-fill braking operation and an emergency braking operation should be initiated.

At step 541 of sub process 340, current SAV parameters may be acquired in combination with the determined road condition from step 325 of sub process 330. The current SAV parameters can include a vehicle make and a vehicle model, appreciating that certain SAV parameters, such as weight, will impact an ability of the SAV to be stopped. Other current vehicle parameters of interest can include tire size, tire width, and the like, and may be obtained according to OEM components of the vehicle make and vehicle model or from information obtained by querying an operator of the SAV following installation of requisite components.

At step 543 of sub process 340, the acquired SAV parameters and road condition determination can be used to obtain a braking table from a database 542 of reference braking tables. The database may be searchable by the above-described road condition determination as well as the acquired SAV parameters. Upon comparison of the acquired SAV parameters and the determined road condition with a reference braking table, a reference braking table determined to be highly correlated may be output from sub process 340 as the braking table to be implemented within the SAV. In an embodiment, the highly correlated reference braking table may be one having an exact match between acquired SAV parameters and the determined road condition. In another embodiment, the highly correlated reference braking table may be one having a greatest match of factors between acquired SAV parameters and the determined road condition.

Each of the reference braking tables can include, in a first column, a speed of the current vehicle and, in at least one subsequent column, a minimum distance to a preceding obstacle for a given road condition, the minimum distance to the preceding obstacle being a distance, associated with a given speed and a respective braking operation (e.g., pre-fill braking operation, emergency braking operation), at which the respective braking operation should be triggered. Alternatively, each of the reference braking tables can include, in a first column, a speed of the current vehicle and, in at least one subsequent column, a time to collision with a preceding obstacle for a given road condition, the time to collision being a time, associated with a given speed, at which a braking operation should be triggered. Though it will be appreciated that both approaches can be implemented, mutatis mutandis, the remaining disclosure will focus on a braking table that includes a current vehicle speed and a minimum distance to a preceding obstacle, for simplicity. Reference tables will be discussed in greater detail with reference to FIG. 6 and subsequent Figures.

In an embodiment, each braking table of the database 542 can be calculated based on experimental tests performed for each scenario of SAV parameters and road conditions. In another embodiment, each braking table of the database 542 may be calculated based on slip ratios and friction coefficients in view of a braking table established for an ideal road condition. For instance, a braking table for an icy condition may be based on a braking table for a dry road condition but adapted based on slip ratios and friction coefficients calculated in real time. In this way, a braking table may be, for instance, a calculated multiple of that for a dry road condition.

An exemplary braking table is shown in FIG. 6. The braking table may include, as in FIG. 6, three or more columns including, in a first column, a speed of a current vehicle, and, in subsequent columns, a minimum distance to a preceding obstacle. The subsequent columns describing the minimum distance to the preceding obstacle can be specific to a braking operation and/or to a road condition. As described above, the minimum distance values in the braking table indicate a minimum distance between the current vehicle (e.g., the SAV) and a preceding obstacle (e.g., a threshold) by which a braking operation should be initiated.

As an exemplary implementation of the exemplary braking table of FIG. 6, an SAV traveling at a constant velocity, or constant speed, of 6 km/h, may be considered. In a first example, methods of the present disclosure may be performed to determine that the road condition is a dry road. Accordingly, 'Dry' columns of the table of FIG. 6 may be considered. At time t=1, the SAV may be at a distance of 1400 mm from a preceding obstacle. Upon analysis of the exemplary braking table of FIG. 6, it can be appreciated that, given the constant speed of 6 km/h and the distance to the preceding obstacle, neither the minimum distance to initiate a pre-fill braking operation nor the minimum distance to initiate an emergency braking operation has been achieved. At time t=2, however, and given the SAV is traveling at the constant speed of 6 km/h, the preceding obstacle may now be at 1330 mm. Upon analysis of the exemplary braking table of FIG. 6, it can be appreciated that, given the constant speed of 6 km/h and the distance to the preceding obstacle, the minimum distance to initiate the pre-fill braking operation has been achieved (i.e., 1330 mm≤1330 mm) while the minimum distance to initiate the emergency braking operation has not been achieved (i.e. 1330 mm≥1000 mm). Accordingly, at time t=2, the pre-fill braking operation may be initiated. Of course, the preceding obstacle may be at a standstill and the distance to the preceding obstacle at time t=3 may now be determined to be 1000 mm. As a result, upon analysis of the exemplary braking table of FIG. 6, it can be determined that, following the application of the pre-fill braking operation, an emergency braking operation may be triggered (i.e., 1000 mm≤1000 mm).

In a second example, the SAV continues traveling at a constant velocity, or constant speed, of 6 km/h, but methods of the present disclosure are performed to determine that the road condition is a snow-covered road. Accordingly, 'Snow' columns of the table of FIG. 6 may be considered. As in the first example, the SAV may be 1400 mm from the preceding obstacle at time t=1. In contrast to the above-determined 'Dry' road condition, analysis of the exemplary braking table of FIG. 6 indicates that, given the constant speed of 6 km/h and the distance to the preceding obstacle, both of the pre-fill braking operation and the emergency braking operation should have already been initiated, as the minimum distance to initiate a pre-fill braking operation and the minimum distance to initiate an emergency braking operation have already been achieved. It can be appreciated that the above example is purely illustrative, and that, when performed in real-time, a pre-fill braking operation and an emergency braking operation may be initiated according to the 'Snow' columns of the braking table of FIG. 6.

The above-described examples demonstrate the significant difference between traveling on 'Dry' road conditions and traveling on 'Snow'-covered road conditions. For instance, given a constant speed of 12 km/h, a minimum distance required for initiating an emergency braking operation on 'Snow'-covered road conditions is 2.8× higher than when on 'Dry' road conditions. A similar relationship exists for pre-fill braking operations.

Moreover, the exemplary braking table of FIG. 6 demonstrates, relative to respective emergency braking operations, the impact of road conditions on when pre-fill braking operations need to be initiated. For instance, given a constant speed of 4 km/h, a minimum distance required for initiating a pre-fill braking operation is ~30% higher than a minimum distance required for initiating an emergency braking operation. When traveling on a 'Snow'-covered road, however, a minimum distance required for initiating a pre-fill braking operation is ~50% higher than a minimum distance required for initiating an emergency braking operation. This observable difference is evidence of the utility of the methods described herein and of the importance of detecting and accommodating different road conditions.

Of course, in either of the 'Dry' road condition or the 'Snow' road condition, or any other detected road condition, it is likely that the current speed of the SAV and the current distance to the preceding obstacle may be values that do not exist within the reference braking table. For these instances, interpolation may be performed based on a function defining the reference values such that intermediate, "unknown", values can be determined and an appropriate braking operation can be safely implemented.

Figure 7A:
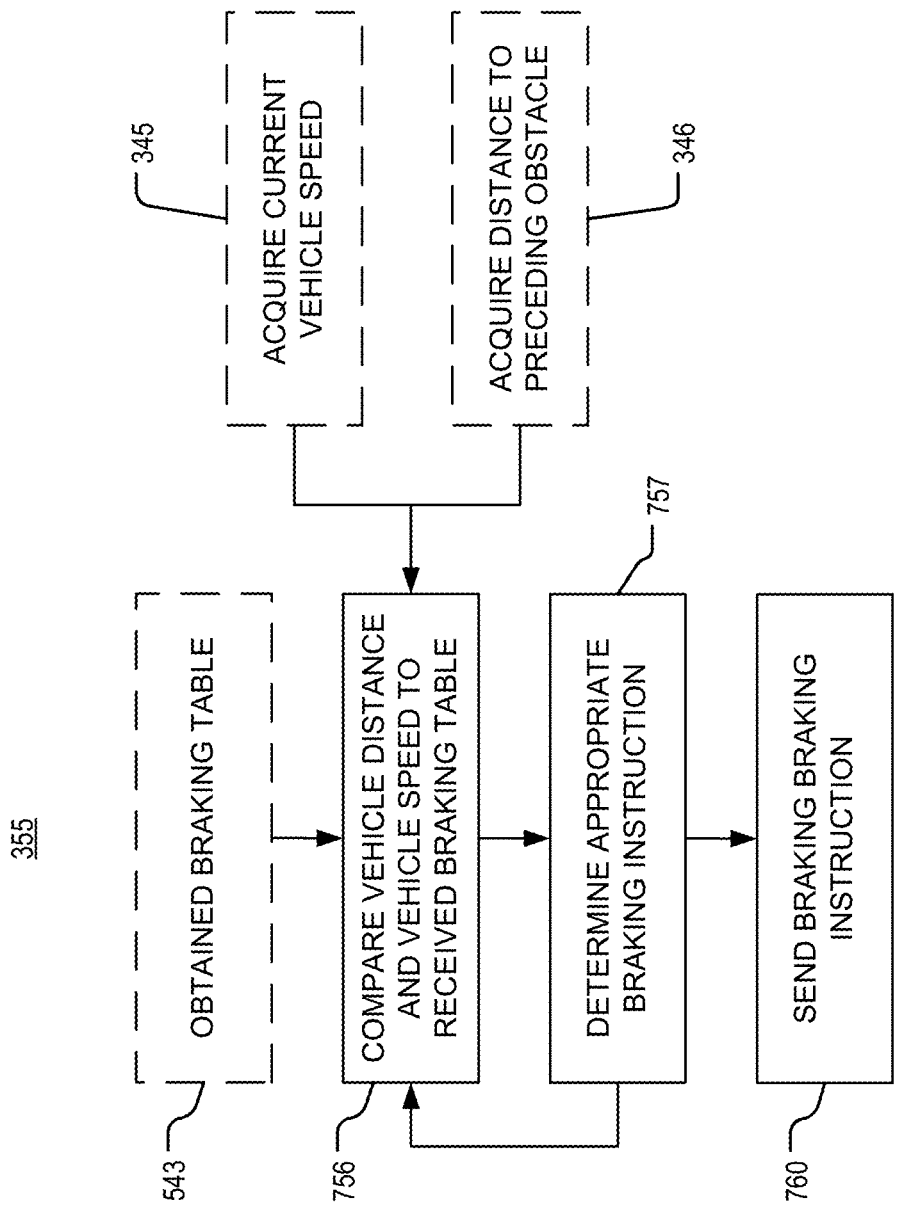
FIG. 7A is a flow diagram of a sub process of a method of performing a braking operation of a vehicle, according to an exemplary embodiment of the present disclosure.

With reference now to FIG. 7A, a generalized implementation of sub process 355 of method 320 will be described.

The braking table obtained at step 543 of sub process 340, the current SAV speed acquired at step 345 of method 320, and the distance to the preceding obstacle, or preceding object, acquired at step 346 of method 320 can be considered together at step 756 of sub process 355. The comparison of these inputs at step 756 of sub process 355 allows for a determination to be made at step 757 regarding initiation of a braking operation.

In an embodiment, the comparison at step 756 of sub process 355 can include considering the acquired distance to the preceding object and the acquired current SAV speed as a data point and comparing the data point to the obtained braking table. In this way, the determination at step 757 of sub process 355 may be that, in the event the data point fails to satisfy conditions for safe stopping (i.e., the acquired distance is less than or equal to the minimum distance to performing a braking operation), a braking operation can be initiated. Accordingly, instructions can be sent to the powertrain control module, or other engine control unit, at step 760 of sub process 355 to initiate the braking operation. Of course, the determination at step 757 of sub process 355 may be that a braking operation need not be initiated (i.e., the acquired distance is greater than the minimum distance to performing a braking operation), as the data point satisfies conditions for safe stopping. In this event, sub process 355 may return to step 756 and the comparison of the obtained braking table, the current SAV speed, and the acquired distance to the preceding object can be iteratively performed.

It is important to note that sub process 355 of method 320, and method 320, can be iteratively performed based on newly acquired road condition information, SAV speed information, and preceding object distance information.

In one example, newly acquired road condition information may necessitate a newly obtained braking table corresponding to the new road condition information.

In another example, newly acquired SAV speed information may indicate that a speed of the SAV has decreased more than expected and, therefore, the braking operation does not need to be sustained to completion.

In another example, newly acquired preceding object distance information may indicate that the preceding object has moved out of the driving tube of the vehicle or that a velocity of the preceding object has increased beyond that of the SAV. In such cases, the braking operation, if initiated, does not need to be continued to completion.

Figure 7B:
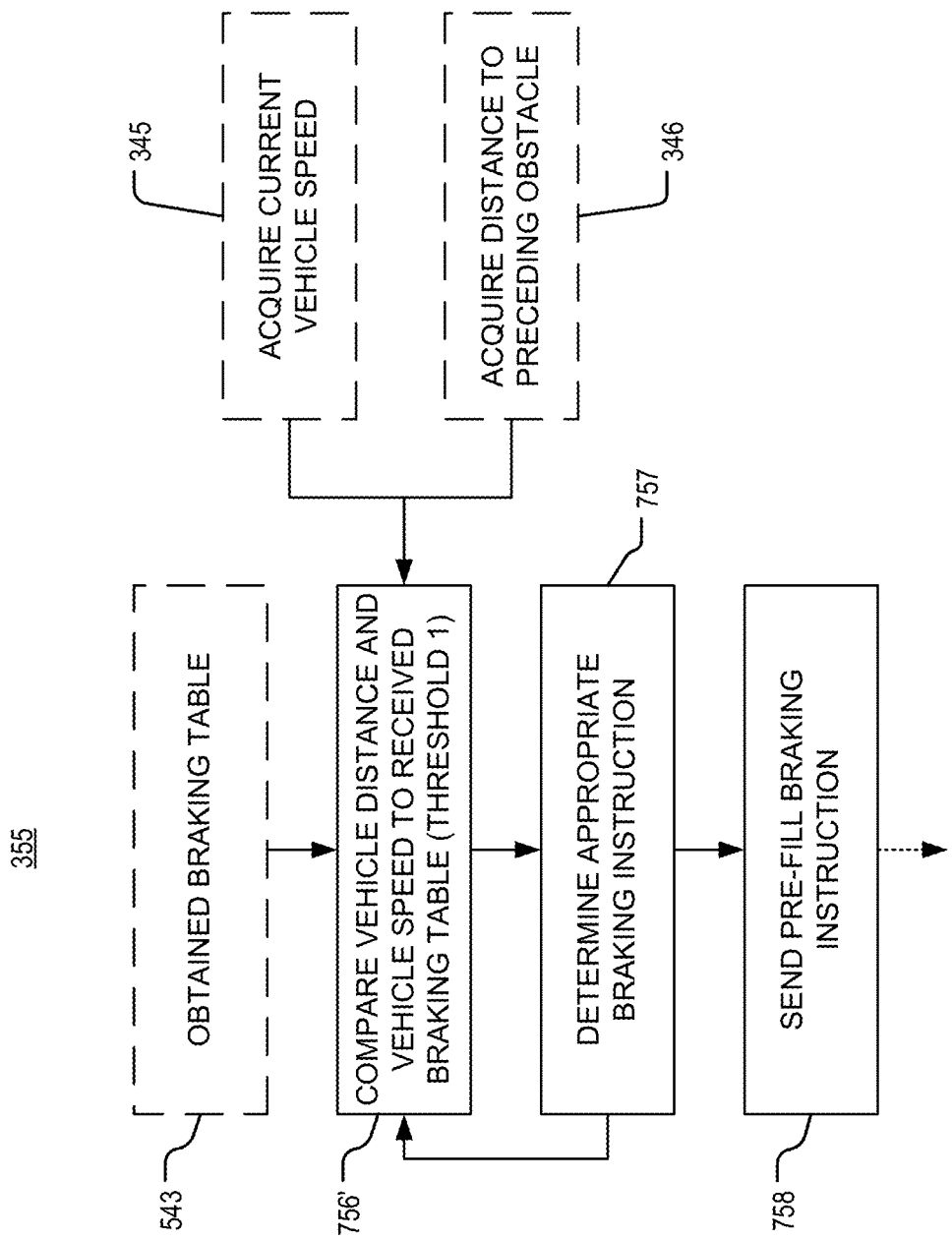
FIG. 7B is a flow diagram of a sub process of a method of performing a braking operation of a vehicle, according to an exemplary embodiment of the present disclosure.
Figure 7C:
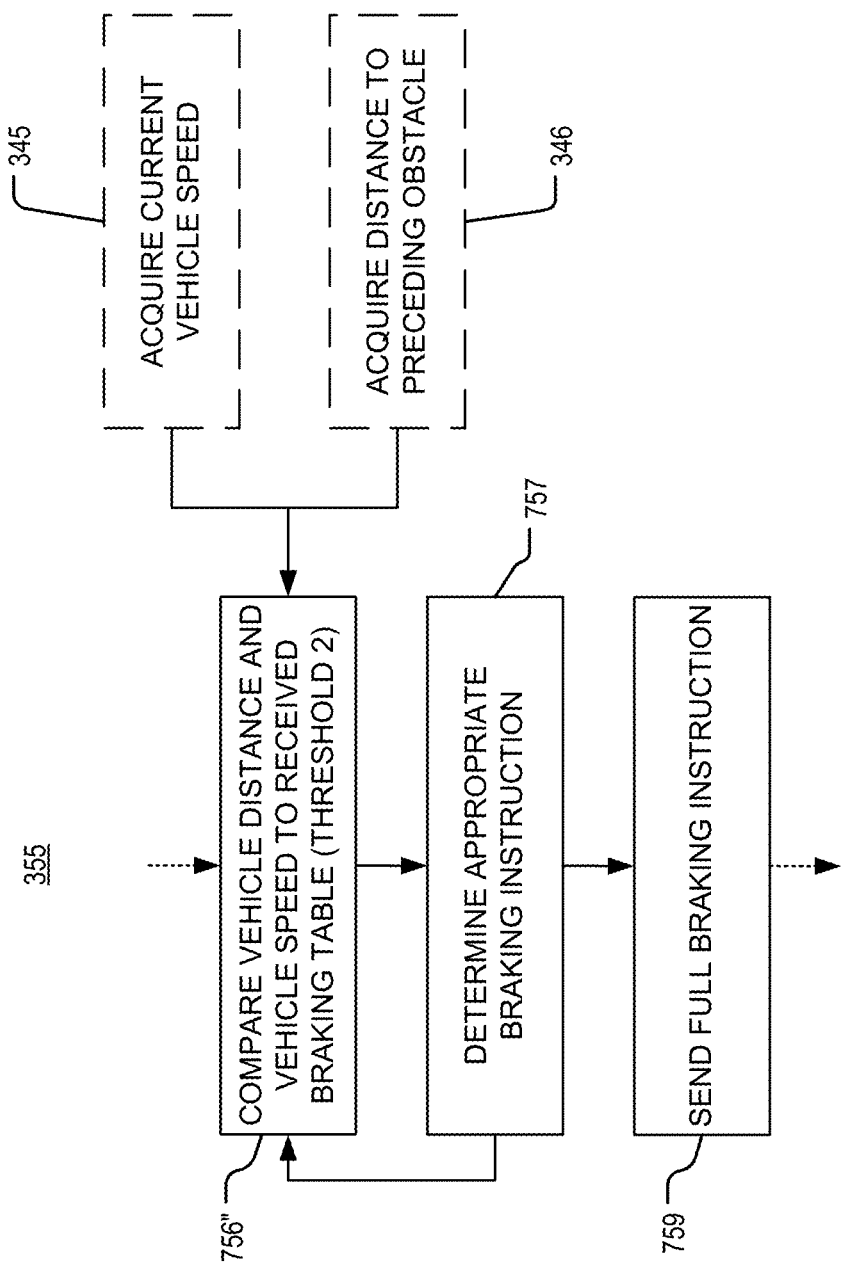
FIG. 7C is a flow diagram of a sub process of a method of performing a braking operation of a vehicle, according to an exemplary embodiment of the present disclosure.

Returning to the Figures, FIG. 7B and FIG. 7C provide additional detail regarding FIG. 7A in the event a pre-fill braking operation is a component of a braking operation. First, with reference to FIG. 7B and in view of FIG. 6D, sub process 355 will be described in the context of a pre-fill braking operation.

The braking table obtained at step 543 of sub process 340, the current SAV speed acquired at step 345 of method 320, and the distance to the preceding object acquired at step 346 of method 320 can be considered together at step 756' of sub process 355. The comparison of these inputs at step 756' of sub process 355 allows for a determination to be made at step 757 regarding initiation of a pre-fill braking operation. The comparison may be performed in view of a first condition defining when the pre-fill braking operation should be initiated. For instance, a pre-fill braking column of the braking table may, in part, define the first condition.

To this end, the comparison at step 756' of sub process 355 can include considering the acquired distance to the preceding object and the acquired current SAV speed as a new data point and comparing the new data point to the pre-fill braking operation data of the braking table. Such a comparison can be appreciated in view of FIG. 6.

In this way, the determination at step 757 of sub process 355 may be that, in the event the new data point fails to satisfy conditions for safe stopping, a pre-fill braking operation can be initiated. Accordingly, instructions can be sent to the powertrain control module, or other engine control unit, at step 760 of sub process 355 to initiate the pre-fill braking operation. Of course, the determination at step 757 of sub process 355 may be that a pre-fill braking operation need not be initiated, as the new data point satisfies conditions for safe stopping. In this event, sub process 355 may return to step 756' and the comparison of the obtained braking table, the current SAV speed, and the acquired distance to the preceding object can be iteratively performed.

The same analysis can be applied to emergency braking operations. For instance, and with reference now to FIG. 7C, a subsequent comparison of the obtained braking table, the acquired SAV speed, and the preceding object distance can be made at step 756" of sub process 355. The comparison of these inputs at step 756" of sub process 355 allows for a determination to be made at step 757 regarding initiation of an emergency braking operation. The comparison may be performed in view of a second condition defining when the emergency braking operation should be initiated. For instance, an emergency braking column of the braking table may, in part, define the second condition.

To this end, the comparison at step 756" of sub process 355 can include considering the acquired distance to the preceding object and the acquired current SAV speed as a data point and comparing the data point to the emergency braking operation data of the braking table. Such a comparison can be appreciated in view of FIG. 6.

In this way, the determination at step 757 of sub process 355 may be that, in the event the data point fails to satisfy conditions for safe stopping or stopping of the SAV following application of the pre-fill braking operation, an emergency braking operation need be initiated. Accordingly, instructions can be sent to the powertrain control module, or other engine control unit, at step 760 of sub process 355 to initiate the emergency braking operation. Of course, the determination at step 757 of sub process 355 may be that an emergency braking operation need not be initiated, as the data point satisfies conditions for stopping. In this event, sub process 355 may return to step 756" and the comparison of the obtained braking table, the current SAV speed, and the acquired distance to the preceding object can be iteratively performed.

It is important to note that sub process 355 of method 320, and method 320, can be iteratively performed in real-time. Moreover, sub process 355 of method 320 and method 320 may be iteratively performed based on newly acquired road condition information, SAV speed information, and preceding object distance information.

In an example, following comparison of the preceding object distance, the SAV speed, and the obtained braking table at step 756", sub process 355 may return to either step 756' or step 756". This allows for accommodation of drastic changes in the above parameters that might affect the application of the braking operation.

In an embodiment, the above-described methods can be implemented on local hardware and/or via communication with remote hardware. Image processing tasks may be performed on local processing circuitry of the vehicle control system of the SAV and/or by wireless communication with remote circuitry, such as servers. The reference database of braking tables may be stored locally by the vehicle control system of the SAV, may be downloadable from a remote storage database, and/or may be wirelessly accessible within the remote storage database in real-time.

Figure 8:
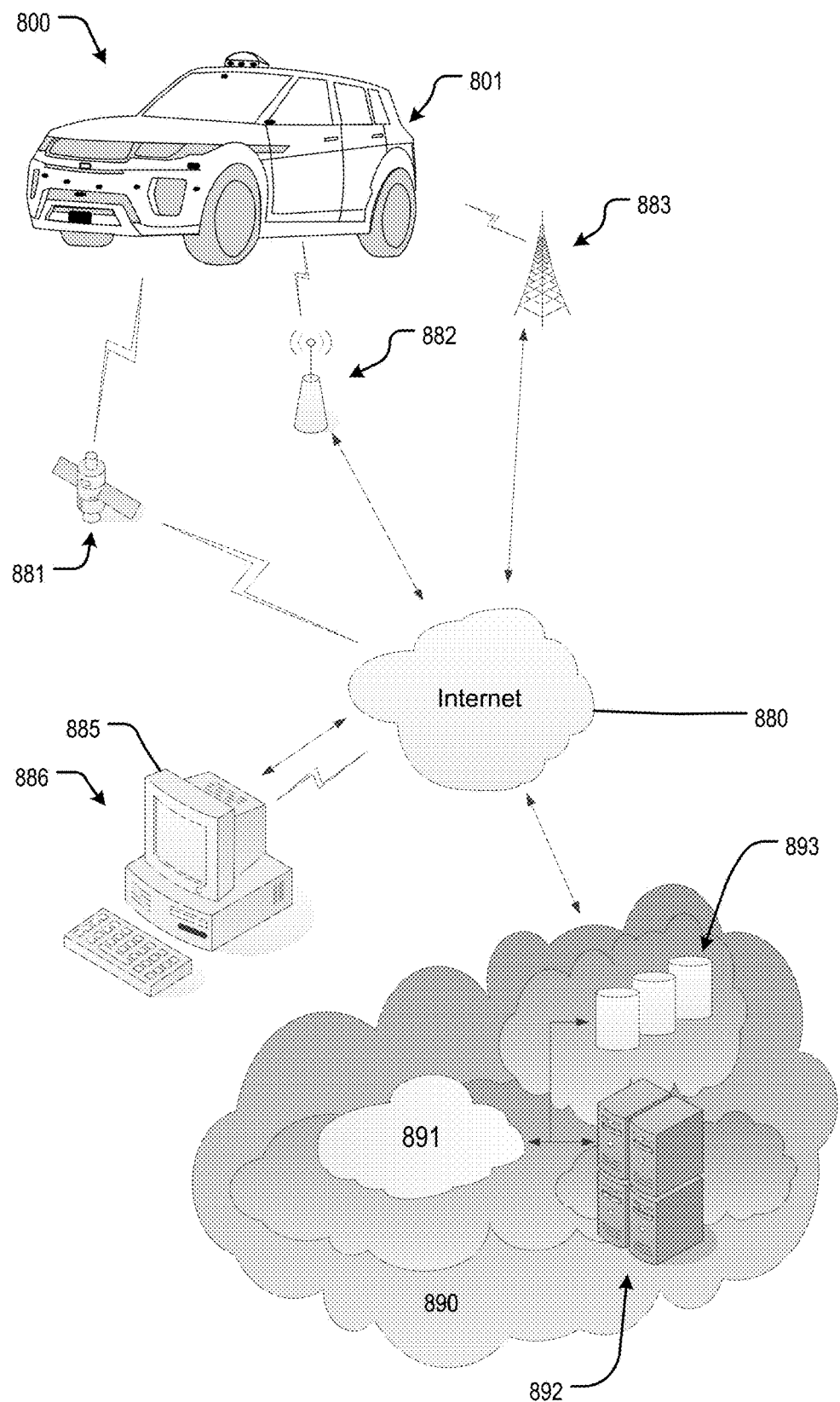
FIG. 8 is a schematic illustrating the communication architecture of a system including a vehicle wherein processing is performed remotely, according to an exemplary embodiment of the present disclosure.

To this end, FIG. 8 illustrates an exemplary Internet-based system, wherein SAVs are connected to a cloud-computing environment, and a remote terminal, via waypoints that are connected to the Internet.

According to an embodiment, an SAV 800 having a vehicle control system 801 can connect to the Internet 880, via a wireless communication hub, through a wireless communication channel such as a base station 883 (e.g., an Edge, 3G, 4G, or LTE Network), an access point 882 (e.g., a femto cell or Wi-Fi network), or a satellite connection 881. A cloud-computing controller 891 in concert with a cloud-computing processing center 892 can permit access to a data storage center 893. The data storage center 893 may contain a braking table database that may be accessed and/or downloaded by the SAV 800. The data storage center 893 may also be updated via a remote terminal 885. The cloud-computing processing center 892 can be a computer duster, a data center, a main frame computer, or a server farm. In one implementation, the cloud-computing processing center 892 and data storage center 893 are collocated.

In an embodiment, raw and/or processed information from a plurality of vehicle sensors can be transmitted to the cloud-computing environment 890 for processing by the cloud-computing processing center 892 and/or storage in the data storage center 893. In the case of raw information, the cloud-computing processing center 892 can perform processing similar to that performed by the vehicle control system 801 of the SAV 800 during SAV operation. These processes include, among other processes, object identification and image classification.

In an embodiment, the cloud-computing processing center 892 may be in communication with a weather forecasting service (e.g., a meteorological service) and may store, for transmittal to the SAV 800, weather forecasts in accordance with a geographic location of the SAV 800, as determined by a Global Positioning System (GPS) receiver of the SAV 800.

According to an embodiment, a remote operator 886 can access the cloud-computing environment 890 through a remote terminal 885, such as a desktop or laptop computer or workstation that is connected to the Internet 880 via a wired network connection or a wireless network connection, in order to update braking tables that may be accessible and/or downloadable by the SAV 800.

FIG. 9 is a block diagram of internal components of an example of a vehicle control system (VCS) that may be implemented, according to an embodiment. As discussed above, the VCS may be an electronics control unit (ECU). For instance, VCS 901 may represent an implementation of a telematics and GPS ECU or a video ECU. It should be noted that FIG. 9 is meant only to provide a generalized illustration of various components, any or all of which may be utilized as appropriate. It can be noted that, in some instances, components illustrated by FIG. 9 can be localized to a single physical device and/or distributed among various networked devices, which may be disposed at different physical locations.

The VCS 901 is shown comprising hardware elements that can be electrically coupled via a BUS 967 (or may otherwise be in communication, as appropriate). The hardware elements may include processing circuitry 961 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 963, depending on desired functionality. The VCS 901 also can include one or more input device controllers 970, which can control without limitation an in-vehicle touch screen, a touch pad, microphone, button(s), dial(s), switch(es), and/or the like. The VCS 901 can also include one or more output device controllers 962, which can control without limitation a display, light emitting diode (LED), speakers, and/or the like.

The VCS 901 might also include a wireless communication hub 964, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 964 may permit data to be exchanged with, as described, in part, with reference to FIG. 8, a network, wireless access points, other computer systems, and/or any other electronic devices described herein. The communication can be carried out via one or more wireless communication antenna(s) 965 that send and/or receive wireless signals 966.

Depending on desired functionality, the wireless communication hub 964 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATs) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The VCS 901 can further include sensor controller(s) 974. Such controllers can control, without limitation, the plurality of vehicle sensors 968, including, among others, one or more accelerometer(s), gyroscope(s), camera(s), RADAR(s), LiDAR(s), Ultrasonic sensor(s), magnetometer(s), altimeter(s), microphone(s), proximity sensor(s), light sensor(s), and the like.

Embodiments of the VCS 901 may also include a Satellite Positioning System (SPS) receiver 971 capable of receiving signals 973 from one or more SPS satellites using an SPS antenna 972. The SPS receiver 971 can extract a position of the device, using conventional techniques, from satellites of an SPS system, such as a global navigation satellite system (GNSS) (e.g., GPS), Galileo, Glonass, Compass, Quasi-Zenith Satellite System (QZSS) over Japan, Indian Regional Navigational Satellite System (IRNSS) over India, Beidou over China, and/or the like. Moreover, the SPS receiver 971 can be used various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

In an embodiment, the SPS receiver 971 of the VCS 901 may be provided as a query to a weather forecasting service (e.g., a meteorological service) in order to obtain a current weather condition in the environment surrounding the SAV. The query may be provided via direct communication with a weather forecasting service via Internet and/or by accessing a weather forecast stored and updated within a cloud-based storage center.

The VCS 901 may further include and/or be in communication with a memory 969. The memory 969 can include, without limitation, local and/or network accessible storage, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The memory 969 of the VCS 901 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

The methods, apparatuses, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method of a braking operation of a vehicle, comprising acquiring at least one image of an external environment of the vehicle, determining a road condition of a road of the external environment of the vehicle based on the acquired at least one image, obtaining, based on the determined road condition and from memory, a braking table of one or more braking tables including distances and corresponding vehicle speeds at which the braking operation is performed, acquiring a speed of the vehicle and a distance between a preceding object and the vehicle, comparing the acquired speed of the vehicle and the acquired distance between the preceding object and the vehicle to the braking table, and sending, by processing circuitry and based on the comparison, an instruction to perform the braking operation of the vehicle.

(2) The method according to (1), wherein the determining determines the road condition by segmenting, within the acquired at least one image, the road of the external environment of the vehicle, and determining the road condition based on the segmented road within the acquired at least one image.

(3) The method according to either (1) or (2), wherein the determining determines the road condition by classifying the segmented road as belonging to one of a plurality of types of road conditions.

(4) The method according to any one of (1) to (3), wherein the plurality of types of road conditions include ice, snow, rain, asphalt, cement, dirt, rocks, and combinations thereof.

(5) The method according to any one of (1) to (4), wherein the sending includes sending, by the processing circuitry, a first instruction to perform a pre-fill brake of a braking system of the vehicle when a first condition of the braking table is met, and sending, by the processing circuitry, a second instruction to perform an emergency braking of the vehicle when a second condition of the braking table is met.

(6) The method according to any one of (1) to (5), wherein the first instruction to perform the pre-fill brake of the braking system of the vehicle includes pressurizing hydraulics of the braking system of the vehicle.

(7) The method according to any one of (1) to (6), wherein, during the pre-fill brake of the braking system of the vehicle, an accelerator pedal of the vehicle is deactivated.

(8) The method according to any one of (1) to (7), wherein the determining determines the road condition based on the acquired at least one image and by obtaining, based on a position of the vehicle, meteorological conditions of the external environment from an Internet-based meteorological service.

(9) An apparatus for providing a braking operation of a vehicle, comprising processing circuitry configured to acquire at least one image of an external environment of the vehicle, determine a road condition of a road of the external environment of the vehicle based on the acquired at least one image, obtain, based on the determined road condition and from memory, a braking table of one or more braking tables including distances and corresponding vehicle speeds at which the braking operation is performed, acquire a speed of the vehicle and a distance between a preceding object and the vehicle, compare the acquired speed of the vehicle and the acquired distance between the preceding object and the vehicle to the braking table, and send, based on the comparison, an instruction to perform the braking operation of the vehicle.

(10) The apparatus according to (9), wherein, to determine the road condition, the processing circuitry is further configured to segment, within the acquired at least one image, the road of the external environment of the vehicle, and determine the road condition based on the segmented road within the acquired at least one image.

(11) The apparatus according to either (9) or (10), wherein the processing circuitry is further configured to classify the segmented road as belonging to one of a plurality of types of road conditions.

(12) The apparatus according to any one of (9) to (11), wherein the plurality of types of road conditions include ice, snow, rain, asphalt, cement, dirt, rocks, and combinations thereof.

(13) The apparatus according to any one of (9) to (12), wherein, to send the instruction, the processing circuitry is further configured to send a first instruction to perform a pre-fill brake of a braking system of the vehicle when a first condition of the braking table is met, and send a second instruction to perform an emergency braking of the vehicle when a second condition of the braking table is met.

(14) The apparatus according to any one of (9) to (13), wherein, in sending the first instruction, the processing circuitry is further configured to pressurize hydraulics of the braking system of the vehicle.

(15) A non-transitory computer-readable storage medium storing computer-readable instructions that, when executed by a computer, cause the computer to perform a method of a braking operation of a vehicle, the method comprising acquiring at least one image of an external environment of the vehicle, determining a road condition of a road of the external environment of the vehicle based on the acquired at least one image, obtaining, based on the determined road condition and from memory, a braking table of one or more braking tables including distances and corresponding vehicle speeds at which the braking operation is performed, acquiring a speed of the vehicle and a distance between a preceding object and the vehicle, comparing the acquired speed of the vehicle and the acquired distance between the preceding object and the vehicle to the braking table, and sending, by processing circuitry and based on the comparison, an instruction to perform the braking operation of the vehicle.

(16) The non-transitory computer-readable storage medium according to (15), wherein the determining determines the road condition by segmenting, within the acquired at least one image, the road of the external environment of the vehicle, and determining the road condition based on the segmented road within the acquired at least one image.

(17) The non-transitory computer-readable storage medium according to either (15) or (16), wherein the determining determines the road condition by classifying the segmented road as belonging to one of a plurality of types of road conditions.

(18) The non-transitory computer-readable storage medium according to any one of (15) to (17), wherein the plurality of types of road conditions include ice, snow, rain, asphalt, cement, dirt, rocks, and combinations thereof.

(19) The non-transitory computer-readable storage medium according to any one of (15) to (18), wherein the sending includes sending, by the processing circuitry, a first instruction to perform a pre-fill brake of a braking system of the vehicle when a first condition of the braking table is met, and sending, by the processing circuitry, a second instruction to perform an emergency braking of the vehicle when a second condition of the braking table is met.

(20) The non-transitory computer-readable storage medium according to any one of (15) to (19), wherein the first instruction to perform the pre-fill brake of the braking system of the vehicle includes pressurizing hydraulics of the braking system of the vehicle.

(21) The non-transitory computer-readable storage medium according to any one of (15) to (20), wherein, during the pre-fill brake of the braking system of the vehicle, an accelerator pedal of the vehicle is deactivated.

(22) The non-transitory computer-readable storage medium according to any one of (15) to (21), wherein the determining determines the road condition based on the acquired at least one image and by obtaining, based on a position of the vehicle, meteorological conditions of the external environment from an Internet-based meteorological service.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of a braking operation of a vehicle, comprising:
   acquiring at least one image of an external environment of the vehicle;
   determining a road surface type and a road condition of a road of the external environment of the vehicle based on the acquired at least one image, wherein the road surface type includes at least one of as asphalt, gravel, cobblestone, dirt and rocks;
   obtaining, based on the determined road surface type and road condition and from memory, a braking table of one or more braking tables including distances and corresponding vehicle speeds at which the braking operation is performed;
   acquiring a speed of the vehicle and a distance between a preceding object and the vehicle;
   comparing the acquired speed of the vehicle and the acquired distance between the preceding object and the vehicle to the braking table; and
   sending, by processing circuitry and based on the comparison, an instruction to perform the braking operation of the vehicle.

2. The method according to claim 1, wherein the determining determines the road surface type and road condition by
   segmenting, within the acquired at least one image, the road of the external environment of the vehicle, and
   determining the road surface type and road condition based on the segmented road within the acquired at least one image.

3. The method according to claim 2, wherein the determining determines the road condition by
   classifying the segmented road as belonging to one of a plurality of types of road conditions.

4. The method according to claim 3, wherein the plurality of types of road conditions include ice, snow, rain, asphalt, cement, dirt, rocks, and combinations thereof.

5. The method according to claim 1, wherein the sending includes
   sending, by the processing circuitry, a first instruction to perform a pre-fill brake of a braking system of the vehicle when a first condition of the braking table is met, and
   sending, by the processing circuitry, a second instruction to perform an emergency braking of the vehicle when a second condition of the braking table is met.

6. The method according to claim 5, wherein the first instruction to perform the pre-fill brake of the braking system of the vehicle includes pressurizing hydraulics of the braking system of the vehicle.

7. The method according to claim 6, wherein, during the pre-fill brake of the braking system of the vehicle, an accelerator pedal of the vehicle is deactivated.

8. The method according to claim 1, wherein the determining determines the road condition based on the acquired at least one image and by
   obtaining, based on a position of the vehicle, meteorological conditions of the external environment from an Internet-based meteorological service.

9. An apparatus for providing a braking operation of a vehicle, comprising:
   processing circuitry configured to
     acquire at least one image of an external environment of the vehicle,
     determine a road surface type and a road condition of a road of the external environment of the vehicle based on the acquired at least one image, wherein the road surface type includes at least one of as asphalt, gravel, cobblestone, dirt and rocks
     obtain, based on the determined road surface type and road condition and from memory, a braking table of one or more braking tables including distances and corresponding vehicle speeds at which the braking operation is performed,
     acquire a speed of the vehicle and a distance between a preceding object and the vehicle,
     compare the acquired speed of the vehicle and the acquired distance between the preceding object and the vehicle to the braking table, and
     send, based on the comparison, an instruction to perform the braking operation of the vehicle.

10. The apparatus according to claim 9, wherein, to determine the road surface type and road condition, the processing circuitry is further configured to
    segment, within the acquired at least one image, the road of the external environment of the vehicle, and
    determine the road surface type and road condition based on the segmented road within the acquired at least one image.

11. The apparatus according to claim 10, wherein the processing circuitry is further configured to
    classify the segmented road as belonging to one of a plurality of types of road conditions.

12. The apparatus according to claim 11, wherein the plurality of types of road conditions include ice, snow, rain, asphalt, cement, dirt, rocks, and combinations thereof.

13. The apparatus according to claim 9, wherein, to send the instruction, the processing circuitry is further configured to
    send a first instruction to perform a pre-fill brake of a braking system of the vehicle when a first condition of the braking table is met, and
    send a second instruction to perform an emergency braking of the vehicle when a second condition of the braking table is met.

14. The apparatus according to claim 13, wherein, in sending the first instruction, the processing circuitry is further configured to
    pressurize hydraulics of the braking system of the vehicle.

15. A non-transitory computer-readable storage medium storing computer-readable instructions that, when executed by a computer, cause the computer to perform a method of a braking operation of a vehicle, the method comprising:
    acquiring at least one image of an external environment of the vehicle;
    determining a road surface type and a road condition of a road of the external environment of the vehicle based on the acquired at least one image, wherein the road surface type includes at least one of as asphalt, gravel, cobblestone, dirt and rocks;
    obtaining, based on the determined road surface type and road condition and from memory, a braking table of one or more braking tables including distances and corresponding vehicle speeds at which the braking operation is performed;

acquiring a speed of the vehicle and a distance between a preceding object and the vehicle;

comparing the acquired speed of the vehicle and the acquired distance between the preceding object and the vehicle to the braking table; and sending, by processing circuitry and based on the comparison, an instruction to perform the braking operation of the vehicle.

16. The non-transitory computer-readable storage medium according to claim 15, wherein the determining determines the road surface type and road condition by segmenting, within the acquired at least one image, the road of the external environment of the vehicle, and determining the road surface type and road condition based on the segmented road within the acquired at least one image.

17. The non-transitory computer-readable storage medium according to claim 16, wherein the determining determines the road condition by classifying the segmented road as belonging to one of a plurality of types of road conditions.

18. The non-transitory computer-readable storage medium according to claim 17, wherein the plurality of types of road conditions include ice, snow, rain, asphalt, cement, dirt, rocks, and combinations thereof.

19. The non-transitory computer-readable storage medium according to claim 15, wherein the sending includes sending, by the processing circuitry, a first instruction to perform a pre-fill brake of a braking system of the vehicle when a first condition of the braking table is met, and sending, by the processing circuitry, a second instruction to perform an emergency braking of the vehicle when a second condition of the braking table is met.

20. The non-transitory computer-readable storage medium according to claim 19, wherein the first instruction to perform the pre-fill brake of the braking system of the vehicle includes pressurizing hydraulics of the braking system of the vehicle.

* * * * *